（12） United States Patent
Ho et al.

(10) Patent No.: US 10,938,620 B2
(45) Date of Patent: Mar. 2, 2021

(54) CONFIGURATION OF A PROGRAMMABLE DEVICE

(71) Applicant: Intel Corporation, Santa Clara, CA (US)

(72) Inventors: Eng Ling Ho, Simpang Ampat (MY); Sean Atsatt, Santa Cruz, CA (US); Chiew Siang Wong, Bayan Lepas (MY); Chin Hai Ang, Bayan Lepas (MY); Rob Pelt, Austin, TX (US); Ee Mei Ooi, Bayan Lepas (MY)

(73) Assignee: INTEL CORPORATION, Santa Clara, CA (US)

( * ) Notice: Subject to any disclaimer, the term of this patent is extended or adjusted under 35 U.S.C. 154(b) by 47 days.

(21) Appl. No.: 16/421,208

(22) Filed: May 23, 2019

(65) Prior Publication Data

US 2019/0342141 A1 Nov. 7, 2019

Related U.S. Application Data

(63) Continuation of application No. 15/438,228, filed on Feb. 21, 2017, now Pat. No. 10,355,909.

(51) Int. Cl.
*H04L 12/24* (2006.01)
*H04L 29/08* (2006.01)

(52) U.S. Cl.
CPC .......... *H04L 41/00* (2013.01); *H04L 67/1002* (2013.01); *H04L 67/1095* (2013.01); *H04L 67/34* (2013.01)

(58) Field of Classification Search
None
See application file for complete search history.

(56) References Cited

U.S. PATENT DOCUMENTS

| 6,526,461 | B1 | 2/2003 | Cliff |
| 9,215,644 | B2 | 12/2015 | Kohli |
| 2007/0072605 | A1 | 3/2007 | Poczo |
| 2018/0069796 | A1 | 3/2018 | Ahmed et al. |

*Primary Examiner* — Brian Whipple
(74) *Attorney, Agent, or Firm* — Fletcher Yoder P.C.

(57) ABSTRACT

Methods and systems for configuring a programmable logic device include receiving configuration data at an input of a first sector of the programmable logic device and dynamically routing the configuration data through the first sector to a second sector of the programmable device by selecting a first routing path out of the first sector or a second routing path out of the first sector.

20 Claims, 8 Drawing Sheets

CONFIGURATION OF A PROGRAMMABLE DEVICE

CROSS-REFERENCE TO RELATED APPLICATIONS

This application is a continuation of U.S. application Ser. No. 15/438,228, entitled "Configuration of a Programmable Device," filed on Feb. 21, 2017, which is incorporated herein by reference in its entirety for all purposes.

BACKGROUND

The present disclosure relates generally to configuration of programmable devices, such as field programmable gate arrays (FPGAs). More particularly, the present disclosure relates to balanced and/or distributed configuration of programmable devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Integrated circuits (ICs) take a variety of forms, such as programmable devices. For instance, field programmable gate arrays (FPGAs) are programmable devices utilizing integrated circuits. Programmable devices may include logic that may be programmed (e.g., configured) post-manufacturing to provide various functionality input by a device owner rather than the device manufacturer. Thus, programmable devices contain programmable logic, or logic blocks, that may be configured to perform a variety of functions on the devices, according to a configured design.

The ICs may be configured in numerous different configurations. These configurations are generally loaded into configuration RAM (CRAM) using a single-direction communication bus or network that limits how quickly the configurations may be loaded into CRAM. For example, configuration of the ICs may be accomplished using a configuration network on chip (CNoC). A CNoC is based on one-way packet traffic that is generally routed in a single direction (e.g., horizontally) along rows of programmable units. This CNoC may be a bottleneck for configuration of the IC device. Moreover, when mirrored CNoCs are used in an IC device, the distribution of configuration may be imbalanced due to the purely one-directional communication of the CNoC.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments relate to systems, methods, and devices for configuring a programmable logic device. Configuration loading of memory (e.g., configuration RAM) within a programmable logic device may be reduced by dynamically routing configuration data through various routing paths and/or networks (e.g., configuration network on chip CNOCs). Each sector may have multiple inputs and outputs with routing circuitry that routes configuration data from any input to any output. Such routing may include multiplexers, registers, logic gates, and the like.

By adding flexibility to configuration data routing through the sectors, configuration loading may be balanced between two or more networks. Furthermore, if sectors in a column have a common configuration, the configuration data may be multicast from a data manager to each of the sectors in the column by utilizing a routing path that is different than that used to transport the configuration data to the column.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
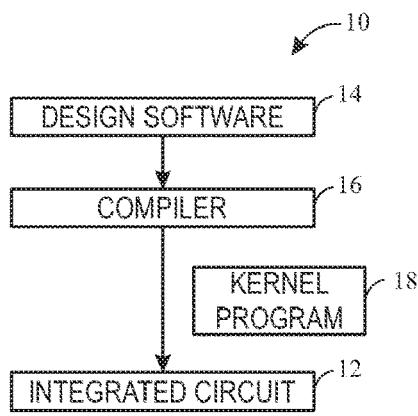
FIG. 1 is a block diagram of a system that utilizes initial condition emulation, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Data in programmable devices may be routed to the multiple sectors of the programmable device along a configuration bus and/or a configuration network on chip (CNoC). Each CNoC is based on one-way packet traffic that is routed in a direction (e.g., horizontally) through multiple sectors (e.g, a row of sectors). However, as discussed below, each sector of the programmable device may be connected to more than one CNoC. Transactions on the CNoC are based on a fixed size (e.g., 32 bit word). For mirrored devices, there may be two CNoC outputs from a configuration controller (e.g., system data manager) that enables internal configuration of multiple sectors. However, non-mirrored devices may use only a single CNoC output.

A configuration with multiple CNoCs may be deployed, because a configuration with each sector connected only to a single CNOC may result in distribution inefficiencies and/or balancing inefficiencies. Moreover, for non-mirrored schemes, only a single CNoC source from the configuration controller fans out to all sectors (e.g., in rows) to reach a maximum configuration bandwidth (e.g., 8 Gbps) limited by CNoC configuration speed. For mirrored schemes, the single CNoC scheme is flipped resulting in two CNoC outputs from the configuration controller to service right and left portions of the device resulting maximum configuration bandwidth (e.g., 16 Gbps) limited by 2× CNoC configuration speed. Moreover, the left and right half of devices may be greatly imbalanced in loading. For example, a left half may consist of only 10 sectors while a right half may consist of 100 sectors. Using only a single CNoC per sector may result in inefficient use of configuration bandwidth by limiting the configuration speed to a speed similar to a single CNoC (e.g., 8 Gbps) most of the time. This is a waste of the second CNoC much of the time during operation because the second CNoC sits idle while the other CNoC continues its remaining sectors (e.g., 90 sectors). In other words, during the times where sectors in the right half are being configured while no sectors are being configured in the left half, the use of configuration bandwidth is inefficient.

As discussed in further detail below, embodiments of the present disclosure relate generally to techniques for dynamically routing configuration data through various routes within a sector enabling the sector to transport received configuration data to a first adjacent sector and/or a second adjacent sector. By implementing flexible routing, a programmable logic device may reuse configuration data between sectors (in a multicast) or may balance loading of configuration networks within the programmable logic device.

While the techniques of this disclosure are described chiefly in the context of reconfigurable devices, such as programmable logic devices with field programmable gate array (FPGA) fabric, this is meant to be illustrative and not limiting. Indeed, the configuration circuitry of this disclosure may be implemented in other programmable device circuits.

With the foregoing in mind, FIG. 1 illustrates a block diagram of a system 10 that is for configuring a programmable device. As discussed above, a designer may implement functionality on an integrated circuit, such as a reconfigurable integrated circuit (IC) 12, such as a field programmable gate array (FPGA). A designer may implement a circuit design to be programmed onto the IC 12 using design software 14, such as a version of Quartus by Altera™. The design software 14 may use a compiler 16 to generate a low-level circuit-design, which may be provided as a kernel program 18, sometimes known as a program object file or bitstream, that programs the integrated circuit 12. That is, the compiler 16 may provide machine-readable instructions representative of the circuit design to the IC 12.

Figure 2:
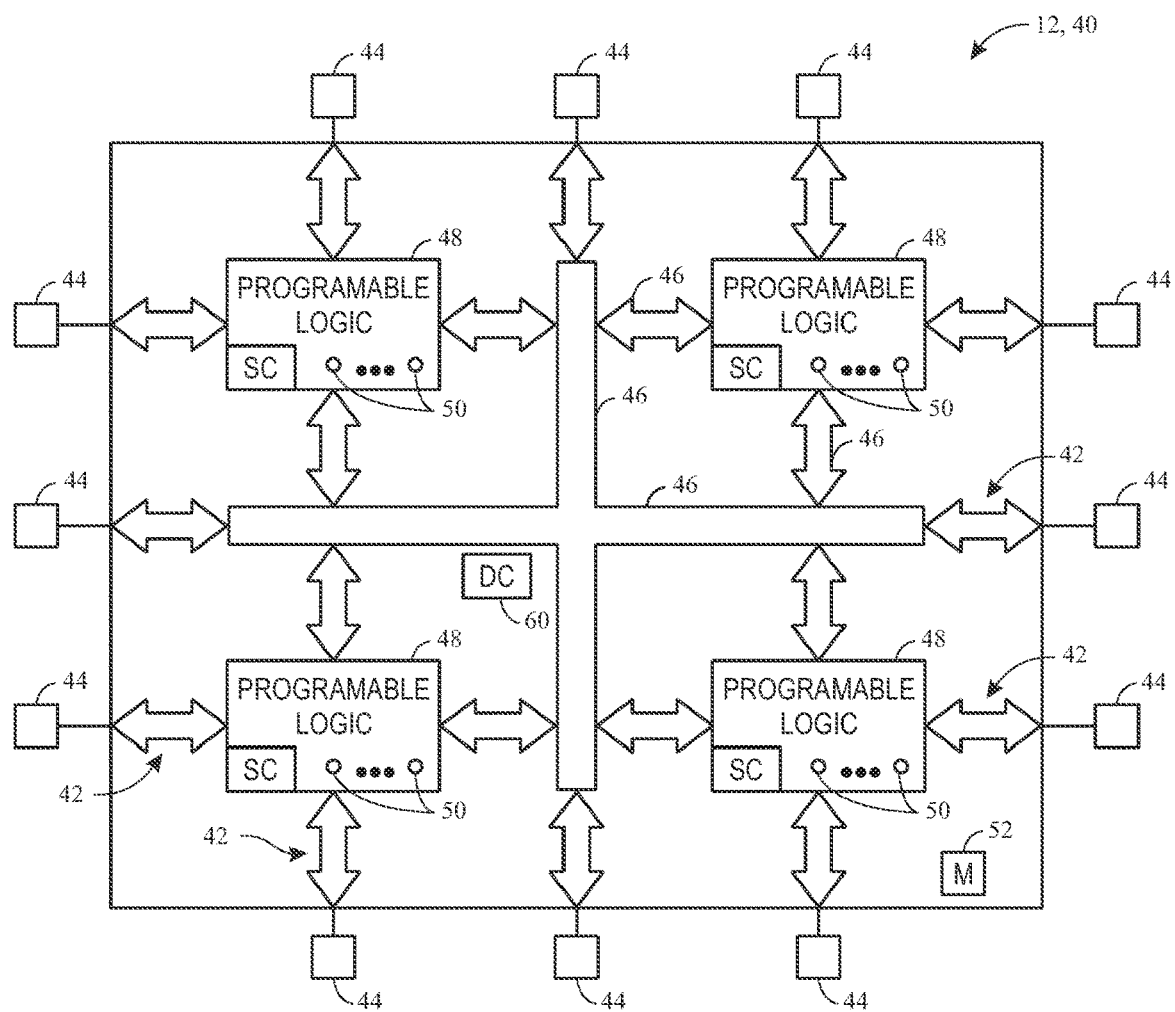
FIG. 2 is a block diagram of a programmable logic device that may include logic useful for implementing the initial condition emulation of FIG. 1, in accordance with an embodiment.

Turning now to a more detailed discussion of the IC 12, FIG. 2 illustrates an IC device 12, which may be a programmable logic device, such as a field programmable gate array (FPGA) 40. For the purposes of this example, the FPGA 40 is referred to as an FPGA, though it should be understood that the device may be any type of programmable logic device (e.g., an application-specific integrated circuit and/or application-specific standard product). As shown, FPGA 40 may have input/output circuitry 42 for driving signals off of FPGA 40 and for receiving signals from other devices via input/output pins 44. Interconnection resources 46, such as global and local vertical and horizontal conductive lines and buses, may be used to route signals on FPGA 40. Additionally, interconnection resources 46 may include fixed interconnects (conductive lines) and programmable interconnects (i.e., programmable connections between respective fixed interconnects). Programmable logic 48 may include combinational and sequential logic circuitry. For example, programmable logic 48 may include look-up tables, registers, and multiplexers. In various embodiments, the programmable logic 48 may be configured to perform a custom logic function. The programmable interconnects associated with interconnection resources may be considered to be a part of programmable logic 48. As discussed in further detail below, the FPGA 40 may include adaptable logic that enables configuration balancing and/or distribution of configuration of the FPGA 40 to efficiently load configurations for the FPGA 40.

Programmable logic devices, such as FPGA 40, may contain programmable elements 50 within the programmable logic 48. For example, as discussed above, a designer (e.g., a customer) may program (e.g., configure) the programmable logic 48 to perform one or more functions (e.g., initial condition initialization). By way of example, some programmable logic devices may be programmed by configuring their programmable elements 50 using mask programming arrangements, which is performed during semiconductor manufacturing. Other programmable logic devices are configured after semiconductor fabrication operations have been completed, such as by using electrical programming or laser programming to program their programmable elements 50. In general, programmable elements 50 may be based on any suitable programmable technology, such as fuses, antifuses, electrically-programmable read-only-memory technology, random-access memory cells, mask-programmed elements, and so forth. For example, in one embodiment, the kernel program 18 may have one or more lookup table (LUT) masks, which set LUTs of the design to a value (e.g., 0 or 1).

Many programmable logic devices are electrically programmed. With electrical programming arrangements, the programmable elements 50 may include one or more logic elements (wires, gates, registers, etc.). For example, during programming, configuration data is loaded into the memory 52 using pins 44 and input/output circuitry 42. In one embodiment, the memory 52 may be implemented as random-access-memory (RAM) cells. The use of memory 52 based on RAM technology is described herein is intended to be only one example. Moreover, memory 52 may be distributed (e.g., as RAM cells) throughout the FPGA 40. Further, because these RAM cells are loaded with configuration data during programming, they are sometimes referred to as configuration RAM cells (CRAM). The memory or CRAM 52 may provide a corresponding static control output signal that controls the state of an associated logic component in programmable logic 48. For instance, in some embodiments, the output signals may be applied to the gates of metal-oxide-semiconductor (MOS) transistors within the programmable logic 48. In some embodiments, the programmable elements 50 may include DSP blocks that implement common operations, such as floating-point adder operations and/or filtering operations implemented using digital signal processing (DSP) blocks.

The circuitry of FPGA 40 may be organized using any suitable architecture. As an example, the logic of FPGA 40 may be organized in a series of rows and columns of larger programmable logic regions, each of which may contain multiple smaller logic regions. The logic resources of FPGA 40 may be interconnected by interconnection resources 46 such as associated vertical and horizontal conductors. For example, in some embodiments, these conductors may include global conductive lines that span substantially all of FPGA 40, fractional lines such as half-lines or quarter lines that span part of FPGA 40, staggered lines of a particular length (e.g., sufficient to interconnect several logic areas), smaller local lines, or any other suitable interconnection resource arrangement. Moreover, in further embodiments, the logic of FPGA 40 may be arranged in more levels or layers in which multiple large regions are interconnected to form still larger portions of logic. Still further, some device arrangements may use logic that is arranged in a manner other than rows and columns.

Figure 3:
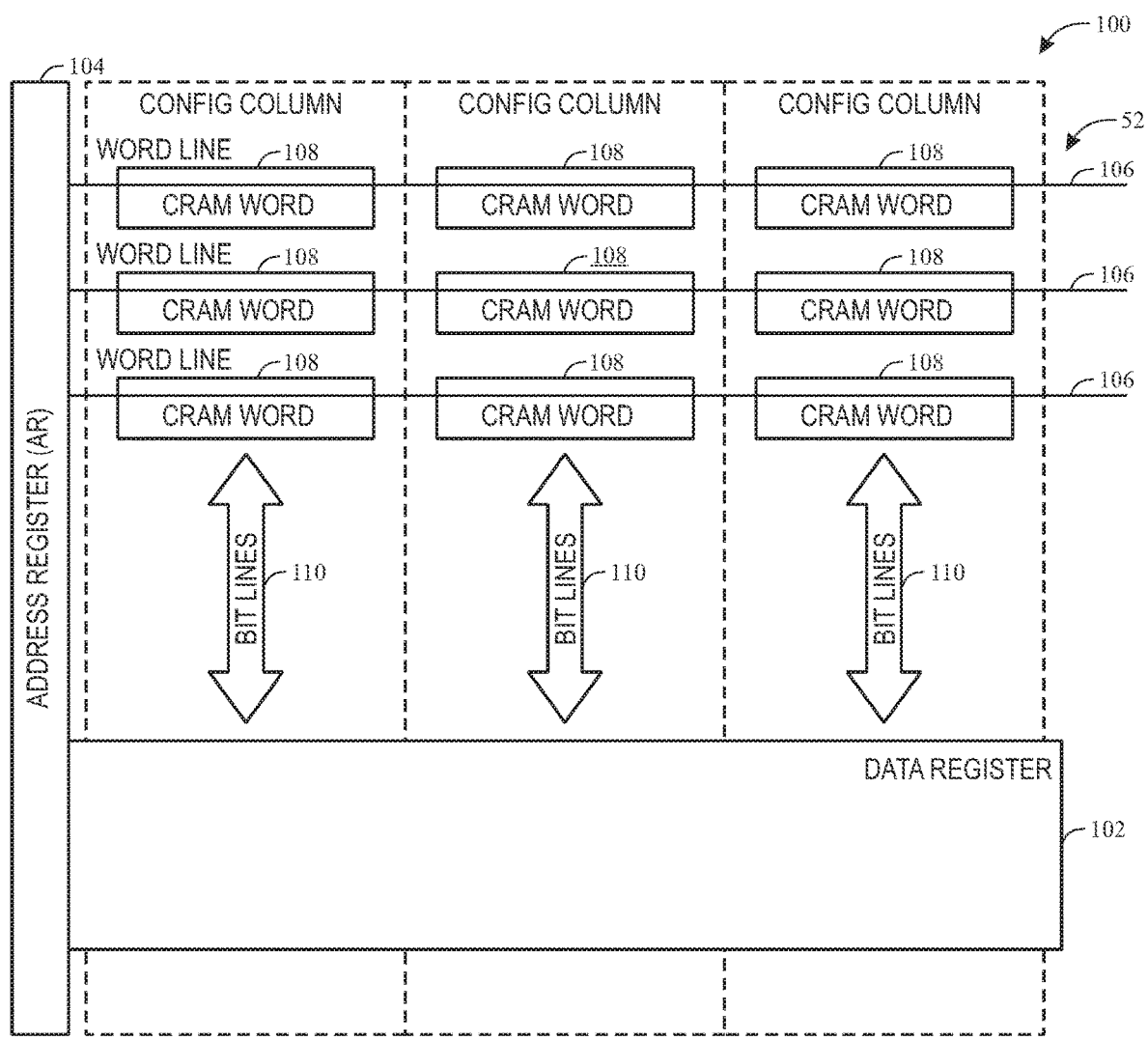
FIG. 3 is a schematic view of a configuration mechanism for configuring CRAM of the programmable logic device of FIG. 2, in accordance with an embodiment.

FIG. 3 illustrates an embodiment of a configuration mechanism 100 that may be used to load configuration data into CRAM 52. The configuration data is loaded into CRAM 52 using a data register (DR) 102. The data in the DR 102 is loaded into an appropriate location in CRAM 52 using an address register (AR) 104. When an appropriate address is asserted by the AR 104 via word lines 106, the target CRAM word 108 in CRAM 52 is accessed, and data is loaded from the DR 102 into the target CRAM word 108 via a respective data line 110, also referred to as bit lines 110.

Figure 4:
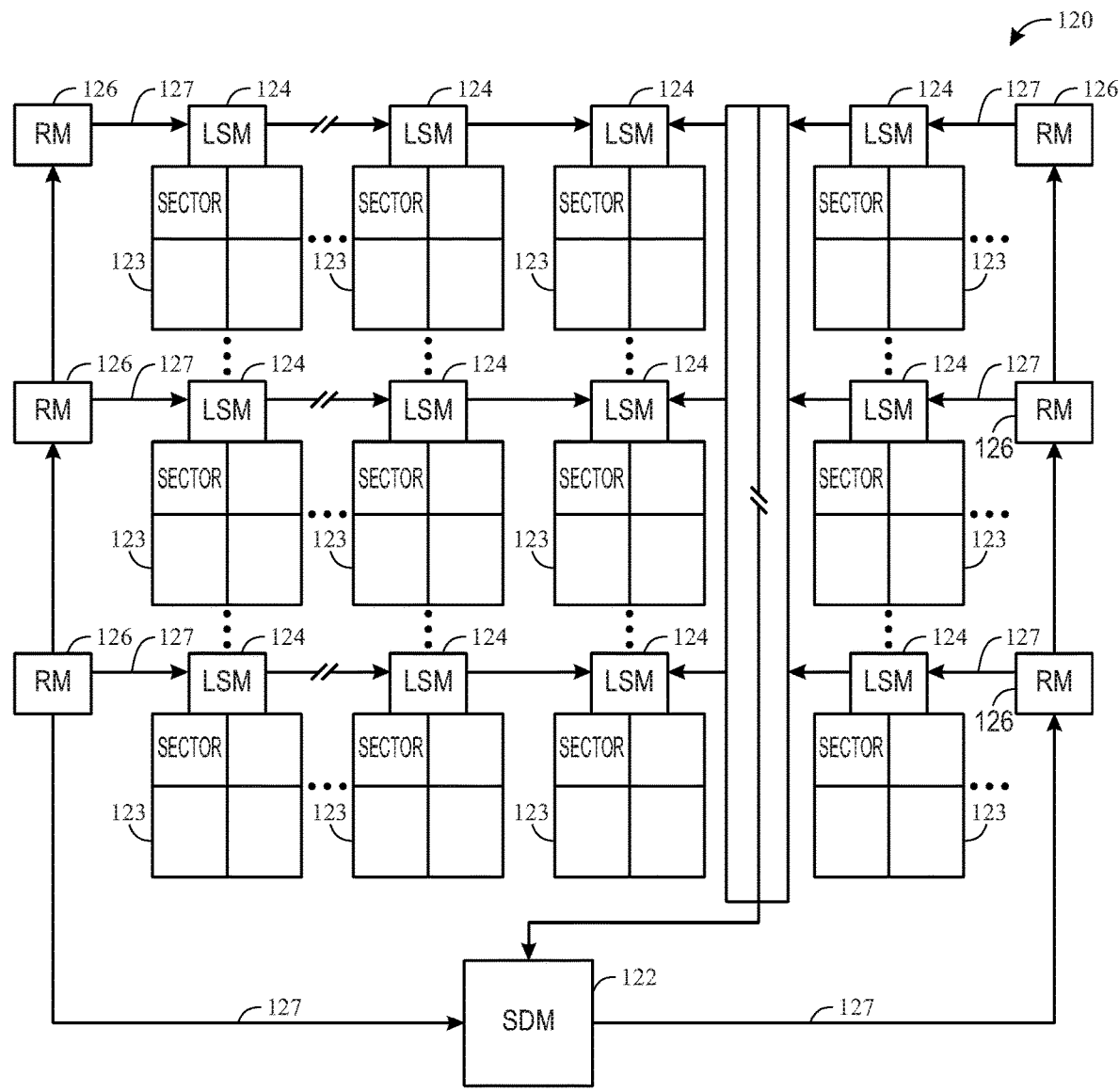
FIG. 4 is a schematic view of a configuration mechanism for configuring CRAM of the programmable logic device of FIG. 2 where the programmable logic device is logically divided into sectors, in accordance with an embodiment.

FIG. 4 illustrates an embodiment of a configuration mechanism 120 with sectored CRAM. The configuration mechanism 120 includes a system data manager (SDM) 122. The SDM may be a processor, such as a processor of any suitable type, such as a reduced instruction set computing (RISC) processor, very long instruction word (VLIW) processor, and/or any other central processing unit (CPU) type suitable for managing configuration of the CRAM.

The CRAM may be sectored into multiple sectors 123 that each include its own address register and data register mechanism. Each sector 123 is configured by its own local sector manager (LSM) 124 using communications from the SDM 122 via a respective row manager (RM) 126 and horizontal CNOC bus 127. The LSM 124 may include a processor of any suitable type, such as a reduced instruction set computing (RISC) processor, very long instruction word (VLIW) processor, and/or any other central processing unit (CPU) type suitable for managing configuration of the CRAM.

Figure 5:
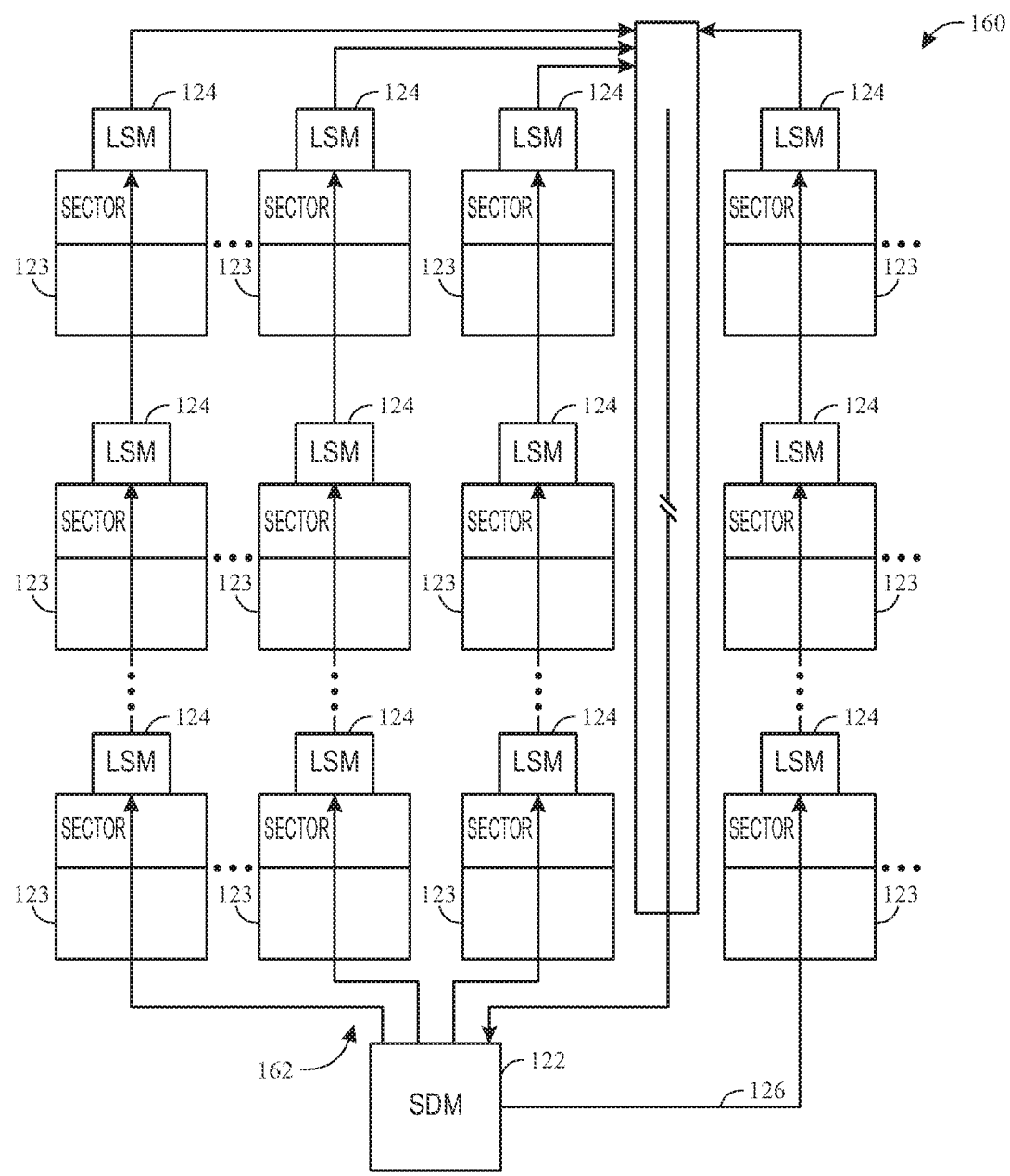
FIG. 5 illustrates a configuration scheme that includes a vertical CNoC bus, in accordance with an embodiment.

To address bandwidth and balancing inefficiencies, a vertical CNoC may be introduced using a software-controlled switchbox to enable flexible routing to balance configuration loads between horizontal and vertical CNoCs. The vertical CNoC may be used in addition to or alternative to the horizontal CNoC of FIG. 4. FIG. 5 illustrates a configuration scheme 160 that includes a vertical CNoC bus 162 to the LSMs 124 from the SDM 122 that may replace or be added to the horizontal CNoC scheme of FIG. 4. When using both a vertical and horizontal CNoC, this additionally flexibility enables more efficient configuration of the CRAM effectively increasing (e.g., doubling) bandwidth to each sector 123.

Figure 6A:
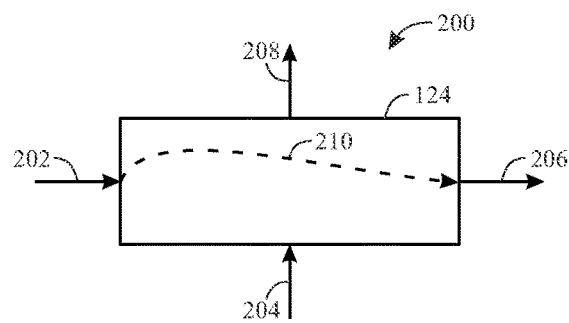
FIG. 6A illustrates a schematic view of a horizontal routing mode, in accordance with an embodiment.

Since each LSM 124 can receive vertical CNoC communications and/or horizontal CNoC communications and outputs in the same busses, each LSM 124 includes routing for receiving data at a horizontal and/or vertical input and routing the data to a horizontal and/or vertical output. FIGS. 6A-6D illustrates embodiments of LSM 124 routing. FIG. 6A illustrates a horizontal (e.g., west-to-east) routing mode 200. The LSM 124 includes a horizontal input 202, a vertical input 204, a horizontal output 206, and a vertical output 208. Although the illustrations include a horizontal bus extending in an easterly (e.g., right) direction into the horizontal input 202 and out the horizontal output 206, the horizontal bus, in some embodiments, may extend in the opposite westerly (e.g., left) direction. Similarly, although the illustrations include a vertical bus extending in a northerly (e.g., upward) direction into the vertical input 204 and out the vertical output 208, the vertical bus, in some embodiments, may extend in the opposite southerly (e.g., downward) direction. In other words, in some embodiments, the locations of the horizontal input 202 and horizontal output 206 may be switched, and/or the locations of the vertical input 204 and the vertical output 208. The LSM 124 in the horizontal routing mode 200 includes routing that transmits received data from the horizontal input 202 to the horizontal output 204.

Figure 6B:
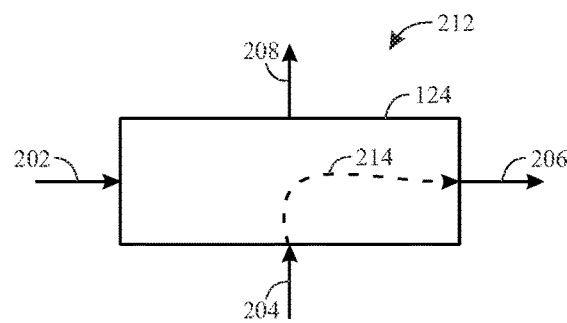
FIG. 6B illustrates a schematic view of a northeast routing mode, in accordance with an embodiment.

FIG. 6B illustrates an LSM 124 in a northeast (e.g., vertical-to-horizontal) configuration 212. The configuration 212 includes routing 214 from the vertical input 204 to the horizontal output 206.

Figure 6C:
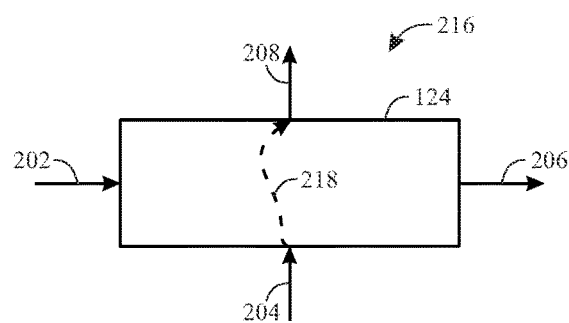
FIG. 6C illustrates a schematic view of a vertical routing mode, in accordance with an embodiment.

FIG. 6C illustrates an LSM 124 in a north (e.g., vertical-to-vertical) configuration 216. The configuration 216 includes routing 218 from the vertical input 204 to the vertical output 208.

Figure 6D:
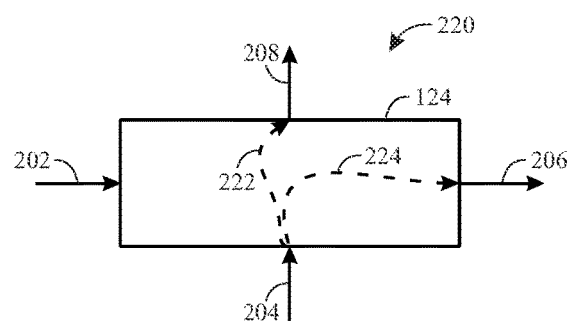
FIG. 6D illustrates a schematic view of a multicast routing mode, in accordance with an embodiment.

FIG. 6D illustrates an LSM 124 in a multi-route (e.g., vertical-to-horizontal-and-vertical) configuration 220. The configuration 220 includes routing 222 from the vertical input 204 to the vertical output 208 and routing 224 from the vertical input 204 to the horizontal output 206. In other words, a multi-route configuration 220 for an LSM 124 causes the LSM 124 to receive data at an input, either horizontal input 202 or vertical input 204. The LSM 124 then outputs the data to both outputs, horizontal output 206 and vertical output 208.

The routing 210, 214, 218, 222, and 224 includes various routing circuitry for routing data through the LSM 124. For example, the routing circuitry may include one or more multiplexers, logic gates, and/or other routing circuitry. For example, logic gates (e.g., AND gates) may AND the inputs together as an input. Logic gates may also be used to AND input data with a respective driving signal (for a specified output) to determine when the data is output of the respective output.

The routing types may be selected according to various factors, such as load balancing or priority assignment. Balancing is used to cause each CNoC to service an equal or similar number of clients (e.g., LSM 124). Priority assignment prioritizes one CNoC over another. For example, a horizontal CNoC may be prioritized to maximize mission mode CNoC coverage and/or larger bandwidth of one CNoC (e.g., horizontal CNoC). The priority assignment may include a priority code for each routing. For example, the priority code may be a first value (e.g., 1) to use horizontal routing and a second value (e.g., 2) to use vertical routing. In some embodiments, both load balancing and priority assignment may be combined into a single load balancing index formula as follows:

$$\text{Load Balancing Index}=\text{minimize}(\Sigma|N_i-N_k|,\Sigma P_m),$$

where $N_i$ is a number of LSMs 124 serviced by $CNoC_i$ (e.g., horizontal CNoC), $N_k$ is a number of LSMs 124 serviced by $CNoC_k$ (e.g., vertical CNoC), and Pm is the priority code for LSM m.

Figure 7:
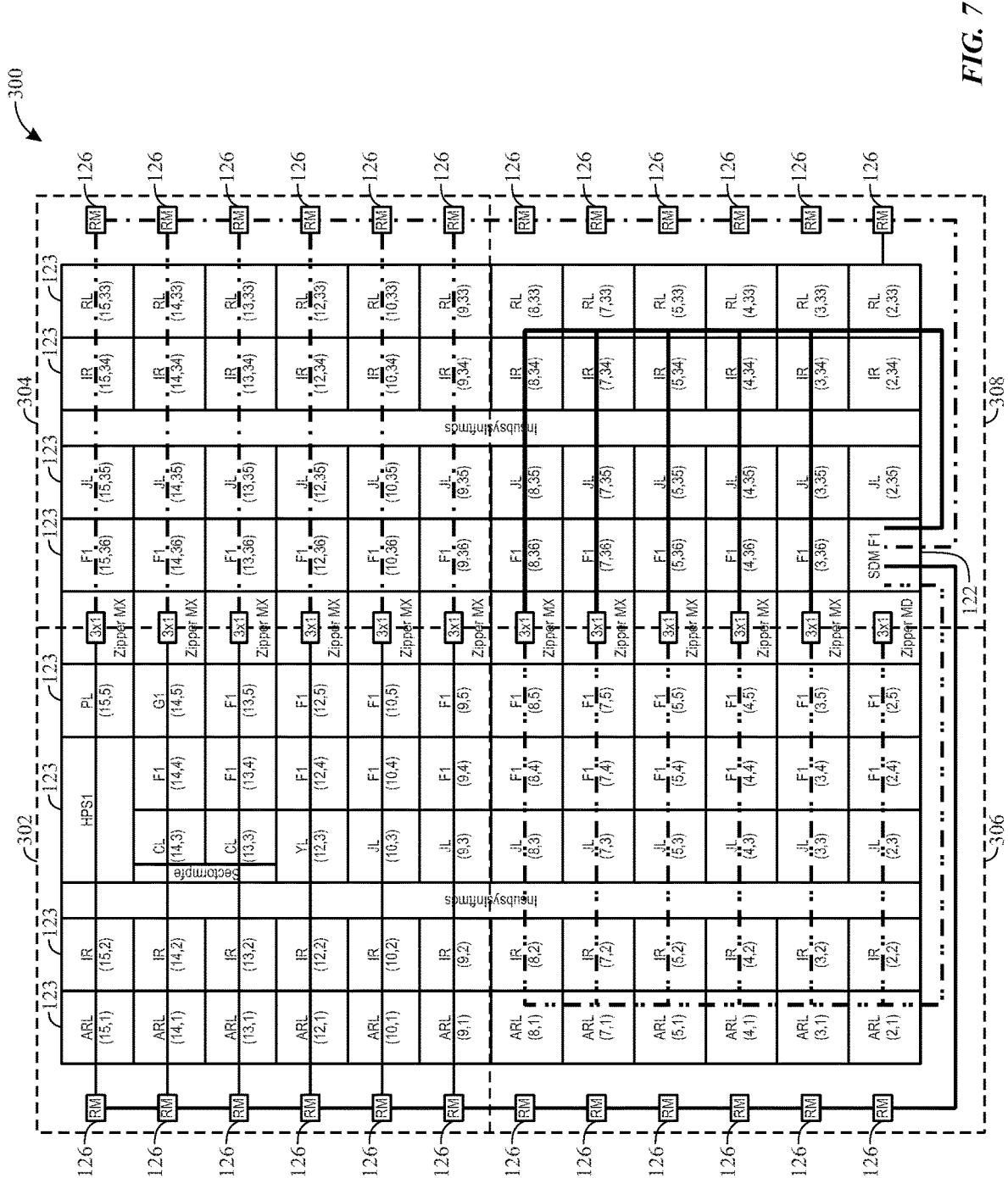
FIG. 7 illustrates a configuration load balancing scheme used to configure CRAM of the programmable logic device of FIG. 2, in accordance with an embodiment.

FIG. 7 illustrates a configuration load balance 300 using horizontal and vertical CNoCs driven by the SDM 122. CRAM sectors 123 are organized into regions 302, 304, 306, and 308. Sectors (2,1), (3,1), (4,1), (5,1), (7,1), (8,1), (2,33), (3,33), (4,33), (5,33), (7,33) and (8,33) are serviced by the vertical CNoC while the rest are serviced by the horizontal CNoC. By loading these sectors vertically, the sectors 123 are divided into four partitions of equal sizes to distribute the configuration load equally while prioritizing using a specific CNoC (e.g., horizontal CNoC).

Figure 8:
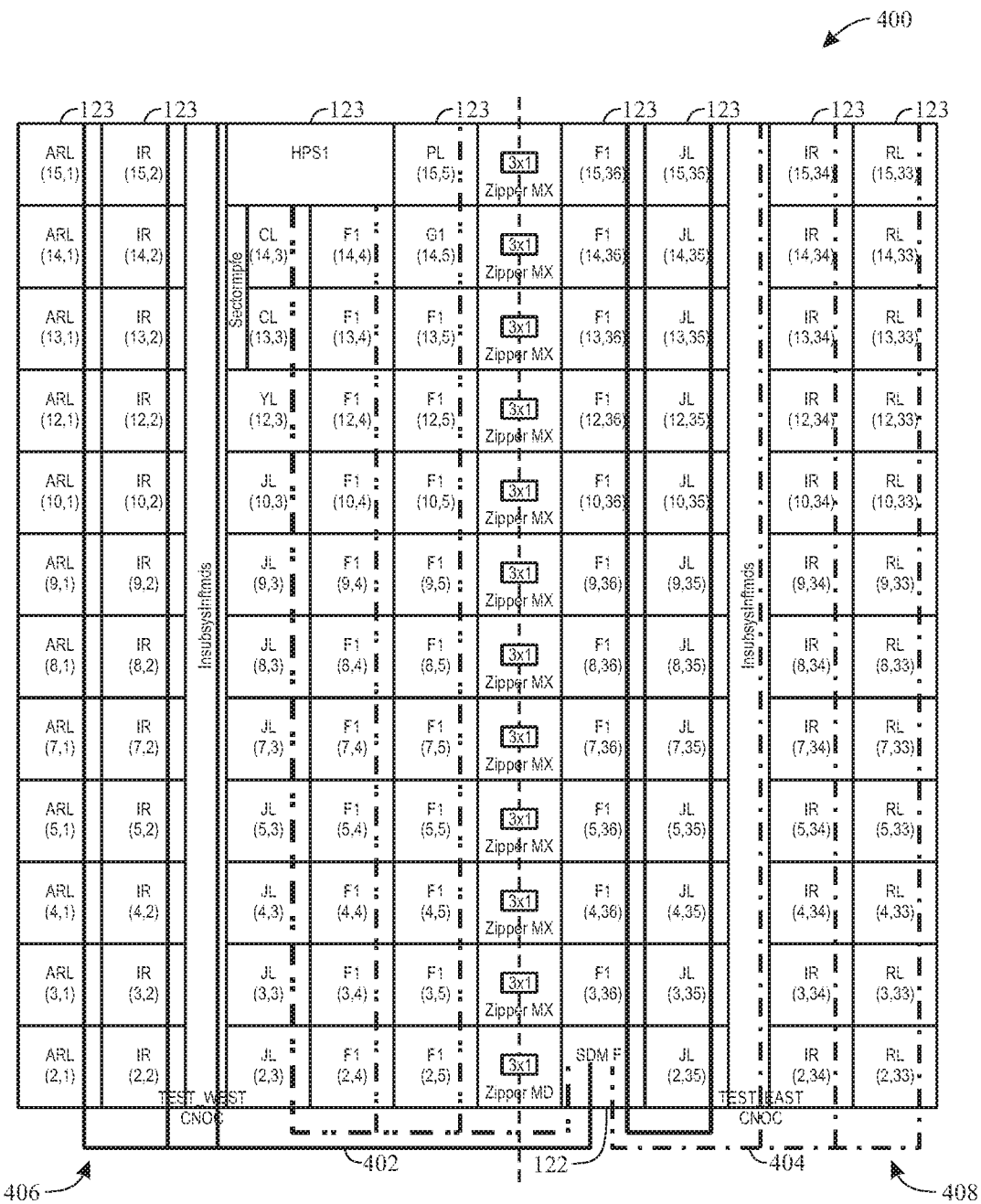
FIG. 8 illustrates a vertical configuration load balancing scheme used to configure CRAM of the programmable logic device of FIG. 2, in accordance with an embodiment.

In some embodiments, load balancing may be performed using only vertical CNoC loading, as illustrated in FIG. 8. In such cases, the priority code may be ignored such that focus is only on prioritizing equality of distribution, and the load balancing may be quantified by the following:

$$\text{Load Balancing Index}=\text{minimize}(\Sigma|N_i-N_k|),$$

where $N_i$ is a number of LSMs 124 serviced by $CNoC_i$ (e.g., left CNoC) and $N_k$ is a number of LSMs 124 serviced by $CNoC_k$ (e.g., right CNoC). In such cases, there may two CNoCs that are both vertical. As illustrated, the configuration scheme of 400 includes a left CNoC 402 and a right CNoC 404 that service different partitions of the sectors 123. Specifically, the left CNoC 402 vertically services a left partition 406 of the sectors 123, and the right CNoC 404 vertically services a right partition 408 of the sectors 123.

Although each individual LSM 124 may receive its own individual data, some sectors may receive the same data. In these cases, this data may be multicast or broadcast to the appropriate LSMs 124. Multicasting allows a packet to be acted upon by a subset of sectors while a broadcast packet is acted on by all of the sectors. Multicast/broadcast transmissions can be used to improve overall configuration bandwidth/throughput when the sectors are to be loaded with identical configurations (e.g., same sector type) and/or capable of receiving same stimulus. The sectors that act on a multicast/broadcast packet are determined by a multicast/broadcast enable control register bit in the transmission. The multicast/broadcast enable bits may be pre-initialized before configuration.

Returning to FIG. 8, for example, multicasting configurations instead of configuring each sector of a similar sector type (e.g., F1 sectors) individually by turning on an enable bit for all the sectors of that type to be configured at the same time. This increases bandwidth and decreases latency in loading configurations. For example, in the F1 sectors case, 31 sectors may configured at the same time rather than sequentially thereby providing a 30× bandwidth improvement. Furthermore, due to the flexibility of using horizontal and/or vertical CNoCs, multicasted data may be distributed to appropriate sectors using multicasting regardless of whether the sectors are in the same row or in the same column.

Figure 9:
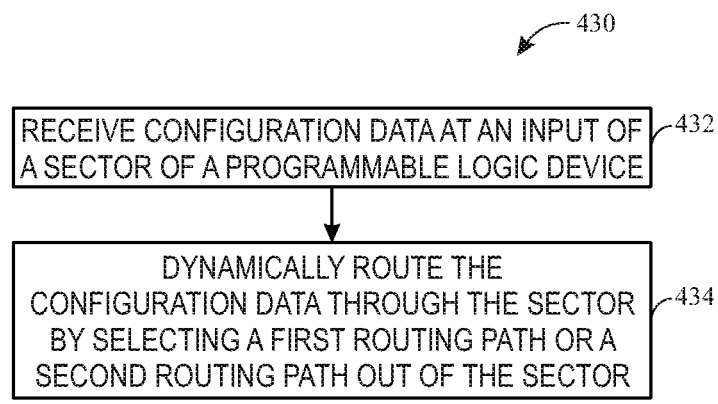
FIG. 9 is a flow diagram illustrating a hardware configuration process, in accordance with an embodiment.

FIG. 9 is a flow chart of a process 430 for configuring a programmable logic device. The process 430 includes receiving configuration data at an input of a first sector of a programmable logic device (block 432). In some embodiments, the input may be any of a number of inputs into the first sector. For instance, the inputs may include an input that is ready to receive the configuration data coming into the sector from a vertical location and/or the inputs may include an input that is ready to receive the configuration data coming into the sector from a horizontal location. The received configuration data is dynamically routed through the first sector to a second sector of the programmable device by selecting a first routing path out of the first sector or a second routing path out of the first sector (block 434). For example, the first routing path may be a vertical path out of the first sector, and the second routing path may be a horizontal path out of the first sector. Moreover, the vertical path (e.g., vertical CNoC) may extend between two or more sectors in a column, and the horizontal path (e.g., horizontal CNoC) may extend between two or more sectors in a row.

The configuration may be multicast to multiple sectors with a single transmission from a configuration controller (e.g., SDM). Before, during, or after routing, the configuration data may be stored locally in the sector (in CRAM). By storing the configuration data and transporting the data out, the configuration data may be multicasted to multiple sectors to further reduce bandwidth consumption of CNoC space between the first sector and a configuration controller. Furthermore, this data may be multicast out of the first sector in a multicast routing mode. That is, the configuration data may be transmitted out of both outputs.

Figure 10:
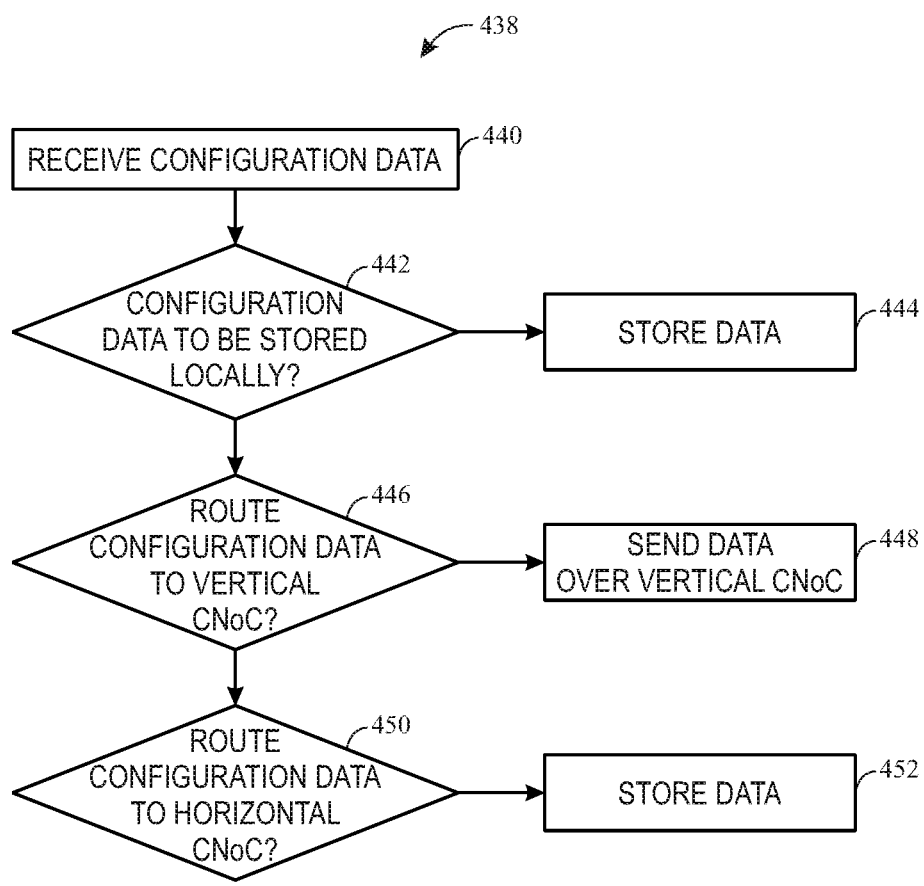
FIG. 10 is a flow diagram illustrating a hardware configuration process with horizontal and vertical CNoCs, in accordance with an embodiment.

FIG. 10 is a flow chart of an embodiment of a process 438 for loading configuration data for a programmable device using multiple networks on chip. A sector manager (e.g., LSM 124) of one or more sectors receives configuration data from a configuration controller (block 440). The configuration data may be received over a vertical configuration network on chip (CNoC) and/or a horizontal CNoC to which the sector is connected. If the configuration data is to be stored locally (block 442), the sector manager stores the data (block 444). The sector manager then determines whether to route the configuration data to the vertical CNoC to a second sector via a first routing path through the sector (block 446). If the configuration data is to be sent over the vertical CNoC, the sector manager sends the configuration data to the second sector via the first routing path over the vertical CNoC (block 448). The sector manager also determines whether to route the configuration data to the horizontal CNoC to a third sector via a second routing path through the sector (block 450). If the configuration data is to be sent over the horizontal CNoC, the sector manager sends the configuration data to the third sector via the second routing path over the horizontal CNoC (block 452). In some embodiments, a single determination may be made whether the configuration data is to be transmitted over the vertical CNoC, the horizontal CNoC, sent to both CNoCs, or not transmitted out whatsoever. Furthermore, although a first CNoC is referred to a vertical CNoC and a second CNoC is referred to as a horizontal CNoC, some embodiments may not include such orientations. In other words, in some embodiments, the first CNoC and the second CNoC may be a vertical CNoC, a horizontal CNoC, or some combination thereof with horizontal and vertical components. For example, two horizontal CNoCs or two vertical CNoCs may be deployed. Furthermore, more than two CNoCs may be deployed for each sector with any combination of CNoCs connected to the sector having a horizontal orientation, a vertical orientation, or any combination of horizontal and vertical orientations.

Furthermore, since the routing through the sectors may be dynamically assigned, load balancing of loading configuration data into sectors may be evenly distributed between one or more networks (e.g., CNoCs) to reduce configuration loading time.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A method for configuring a programmable logic device, comprising:
    receiving configuration data at an input of a first sector of the programmable logic device; and
    dynamically routing the configuration data through the first sector to a second sector or a third sector of the programmable logic device by selecting a first routing path out of the first sector or a second routing path out of the first sector using one of a first bus of a first plurality of buses or a second bus of a second plurality of buses, wherein the first plurality of buses connects rows of sectors of the programmable logic device together in a first direction, wherein the second plurality of buses connects columns of sectors of the programmable logic device together in a second direction, wherein the first direction is cross-wise to the second direction, and wherein dynamically routing the configuration data comprises:
        sending the configuration data over the first bus to the second sector via the first routing path when the first routing path is selected; and
        sending the configuration data over the second bus to the third sector via the second routing path when the second routing path is selected.

2. The method of claim 1, wherein the first direction comprises a vertical direction, and the second direction comprises a horizontal direction.

3. The method of claim 1, wherein the first plurality of buses extends through a plurality of sectors of the programmable logic device that includes the first and second sectors.

4. The method of claim 1, wherein the second plurality of buses extends through a plurality of sectors of the programmable logic device that includes the first and third sectors.

5. The method of claim 1, wherein receiving the configuration data at an input of the first sector comprises receiving the configuration data at the input out of a plurality of inputs to the first sector.

6. The method of claim 5, wherein the input comprises an input to the first sector from the first direction.

7. The method of claim 5, wherein the input comprises an input to the first sector from the second direction.

8. A programmable device comprising:
    a plurality of sectors, wherein a sector of the plurality of sectors comprise:
        a plurality of programmable elements;
        a configuration input that receives configuration data used to configure the plurality of programmable elements;
        routing circuitry that routes the configuration data to adjacent sectors, wherein the routing circuitry comprises:
            a first output that transports the configuration data to a first adjacent sector via at least one of a first plurality of buses when routed to the first output, wherein the first plurality of buses passes the configuration data in a first direction when the configuration data is transported to the first adjacent sector; and
            a second output that transports the configuration data to a second adjacent sector via at least one of a second plurality of buses when routed to the second output, wherein the second plurality of buses passes the configuration data in a second direction when the configuration data is transported to the second adjacent sector, wherein the first and second directions are cross-wise to each other.

9. The programmable device of claim 8, comprising a configuration controller configured to control routing of the configuration data within the programmable device through the respective sector based at least in part on load balancing of the first and second plurality of buses.

10. The programmable device of claim 9, wherein the configuration controller prioritizes the first output or the second output.

11. The programmable device of claim 10, wherein the prioritization of the first output or the second output by the configuration controller comprises prioritizing the output that has a higher bandwidth path.

12. The programmable device of claim 8, comprising one or more configuration networks on chip comprising the first and second plurality of buses.

13. The programmable device of claim 8, wherein the respective sector comprises configuration memory that stores the configuration data for configuring the programmable elements.

14. The programmable device of claim 8, wherein the routing circuitry routes the configuration data to both the first output and the second output during a multicast routing mode.

15. The programmable device of claim 8, wherein the configuration input receives the configuration data over the first plurality of buses.

16. The programmable device of claim 8, comprising an additional input that receives the configuration data over the second plurality of buses.

17. The programmable device of claim 8, wherein the first plurality of buses couples columns of the plurality of sectors together, and the second plurality of buses couples row of the plurality of sectors together.

18. A programmable device comprising:
    a configuration controller configured to control routing of configuration data within the programmable device;
    a plurality of sectors arranged in a plurality of rows and columns, wherein a first sector of the plurality of sectors comprises:
        a plurality of programmable elements; and configuration memory that stores configuration data for the first sector that controls a configuration of the plurality of programmable elements when loaded from the configuration memory; and a first plurality of buses coupling rows of sectors of the plurality of sectors together in a first direction; and a second plurality of buses coupling columns of sectors of the plurality of sectors together in a second direction, wherein the first and second directions are not parallel to each other, and wherein the configuration controller determines whether to route the configuration data for the first sector via the first plurality of buses or the second plurality of buses to load balance configuration data distribution to the plurality of sectors between the first and second pluralities of buses.

19. The programmable device of claim 18, wherein the configuration controller is configured to route configuration data common to two or more sectors of the plurality of sectors to both the first and second pluralities of buses in a multicast transmission.

20. The programmable device of claim 18, wherein each sector of the plurality of sectors comprises routing circuitry having:

a first connection route from a first bus of the first plurality of buses and to a second bus of the first plurality of buses;

a second connection route from the first bus of the first plurality of buses and to a third bus of the second plurality of buses;

a third connection route from a fourth bus of the second plurality of buses and to the second bus of the first plurality of buses; and a fourth connection route from the fourth bus of the second plurality of buses and to the third bus of the second plurality of buses.

* * * * *